(12) United States Patent
Yamashita

(10) Patent No.: US 12,323,536 B2
(45) Date of Patent: Jun. 3, 2025

(54) INFORMATION PROCESSING APPARATUS AND CONTROL METHOD FOR INFORMATION PROCESSING APPARATUS

(71) Applicant: CANON KABUSHIKI KAISHA, Tokyo (JP)

(72) Inventor: Takahiro Yamashita, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 18/053,651

(22) Filed: Nov. 8, 2022

(65) Prior Publication Data
US 2023/0155840 A1 May 18, 2023

(30) Foreign Application Priority Data
Nov. 12, 2021 (JP) .................. 2021-184542

(51) Int. Cl.
*H04L 9/32* (2006.01)

(52) U.S. Cl.
CPC .................. *H04L 9/3249* (2013.01)

(58) Field of Classification Search
CPC ...... G06F 21/575; G06F 21/572; G06F 21/57; G06F 21/64; G06F 2221/033; G06F 9/44589; H04L 9/14; H04L 9/3247; H04L 9/3249
See application file for complete search history.

(56) References Cited

U.S. PATENT DOCUMENTS

| | | | | |
|---|---|---|---|---|
| 5,581,600 A * | 12/1996 | Watts | ................... | H04Q 3/0062 379/88.07 |
| 7,643,691 B2 * | 1/2010 | Sato | ...................... | G06F 3/1247 345/23 |
| 7,792,760 B2 * | 9/2010 | Nakazawa | ............ | G06F 21/608 380/278 |
| 8,464,249 B1 * | 6/2013 | Goldman | ................ | H04L 67/34 717/176 |
| 11,212,110 B1 * | 12/2021 | Griffin | .................. | H04L 9/3247 |
| 2001/0010720 A1 * | 8/2001 | Kimball | ............... | H04N 21/435 713/160 |
| 2002/0108041 A1 * | 8/2002 | Watanabe | ............. | H04L 9/3249 713/175 |
| 2003/0037246 A1 * | 2/2003 | Goodman | ............. | G06F 21/572 713/191 |
| 2004/0073806 A1 * | 4/2004 | Zimmer | ................ | G06F 21/575 713/189 |
| 2007/0026894 A1 * | 2/2007 | Zatloukal | ............. | H04B 1/3816 455/558 |

(Continued)

FOREIGN PATENT DOCUMENTS

JP 2006191207 A 7/2006

*Primary Examiner* — Michael Simitoski
(74) *Attorney, Agent, or Firm* — Canon U.S.A., Inc. IP Division

(57) ABSTRACT

An information processing apparatus verifies, by using a fact that a first encryption scheme is supported and a second encryption scheme is not supported, whether or not a first signature corresponding to the first encryption scheme is valid, verifies, by using a fact that the first encryption scheme is not supported and the second encryption scheme is supported, whether or not a second signature corresponding to the second encryption scheme is valid, and executes, when the first signature or the second signature is verified to be valid, a program.

13 Claims, 6 Drawing Sheets

(56) References Cited

U.S. PATENT DOCUMENTS

| | | | |
|---|---|---|---|
| 2008/0130893 A1* | 6/2008 | Ibrahim | G06F 21/572 |
| | | | 380/277 |
| 2011/0291803 A1* | 12/2011 | Bajic | G08B 13/2462 |
| | | | 340/10.1 |
| 2014/0040636 A1* | 2/2014 | Jeansonne | G06F 21/575 |
| | | | 713/189 |
| 2014/0129818 A1* | 5/2014 | Li | G06F 9/4403 |
| | | | 713/2 |
| 2018/0032734 A1* | 2/2018 | Gunti | G06F 21/575 |
| 2018/0276387 A1* | 9/2018 | Liu | G06F 21/575 |
| 2019/0114429 A1* | 4/2019 | Shimizu | G06F 21/572 |
| 2019/0163497 A1* | 5/2019 | Samuel | G06F 11/1469 |
| 2019/0289154 A1* | 9/2019 | Konosu | H04N 1/0088 |
| 2020/0134200 A1* | 4/2020 | Williams | H04L 9/0827 |
| 2020/0226260 A1* | 7/2020 | Aggarwal | G06F 21/566 |
| 2020/0311279 A1* | 10/2020 | Goda | G06F 21/575 |
| 2021/0406378 A1* | 12/2021 | Jeansonne | G06F 21/602 |
| 2023/0195473 A1* | 6/2023 | Li | G06F 21/85 |
| | | | 713/2 |
| 2023/0269080 A1* | 8/2023 | Wirth | H04L 9/0838 |
| | | | 380/28 |

* cited by examiner

| PRODUCT ID 701 | ENCRYPTION SCHEME 702 |
|---|---|
| 1 | RSA 2048 |
| 2 | RSA 2048 |
| 3 | RSA 3072 |
| 4 | RSA 3072 |

INFORMATION PROCESSING APPARATUS AND CONTROL METHOD FOR INFORMATION PROCESSING APPARATUS

BACKGROUND

Field of the Disclosure

The present disclosure relates to an information processing apparatus and a control method for the information processing apparatus.

Description of the Related Art

In some recent image forming apparatuses, there is provided a tampering detection function in which, for example, a signature verification process is performed for a program to be booted in booting the program to thereby determine whether or not the program is a valid program, thus keeping an invalid program from being booted. As an encryption scheme used for signature verification, various schemes, such as Rivest-Shamir-Adleman (RSA) encryption and elliptic curve encryption, are used.

Typical encryption schemes will be endangered in the future due to the increasing speed of computing machinery or improvements in analysis technology, and thus the encryption schemes have to be changed over to another secure encryption scheme during a fixed time period.

With these circumstances as a backdrop, it is not uncommon that one apparatus includes keys based on a plurality of encryption schemes to thus support the plurality of encryption schemes. Similarly, some programs to be verified are considered to include a plurality of electronic signatures and thus be subjected to a signature verification process using a plurality of encryption schemes. Thus, for example, for both of an old model in which a key changeover is difficult and a new model in which a more secure key is included, individual programs corresponding to the respective keys do not have to be provided, and one type of program can support any models.

Japanese Patent Laid-Open No. 2006-191207 discloses a method in which communication equipment that supports a plurality of encryption schemes changes, in accordance with the condition of a processing load on the communication equipment, an encryption scheme that is used and transmits encrypted data.

SUMMARY

Embodiments of the present disclosure provide an information processing apparatus that includes a storage device configured to store a program including at least a first signature generated by using a first encryption scheme and at least a second signature generated by using a second encryption scheme, and a controller having one or more processors which execute instructions stored in one or more memories, the controller being configured to: verify, by using a fact that the first encryption scheme is supported and the second encryption scheme is not supported, whether or not the first signature corresponding to the first encryption scheme is valid, verify, by using a fact that the first encryption scheme is not supported and the second encryption scheme is supported, whether or not the second signature corresponding to the second encryption scheme is valid, and execute, when the first signature or the second signature is verified to be valid, the program.

Further features of the present disclosure will become apparent from the following description of exemplary embodiments with reference to the attached drawings.

DESCRIPTION OF THE EMBODIMENTS

Embodiments of the present disclosure will be described in detail with reference to the accompanying drawings. Furthermore, the following embodiments are not intended to limit the disclosure, and all combinations of features to be described in the embodiments are not necessarily essential to a method of solution in the disclosure. In the embodiments, descriptions will be provided by taking an image forming apparatus as an example of an information processing apparatus, but the information processing apparatus is not limited to this.

Embodiment 1

Figure 1:
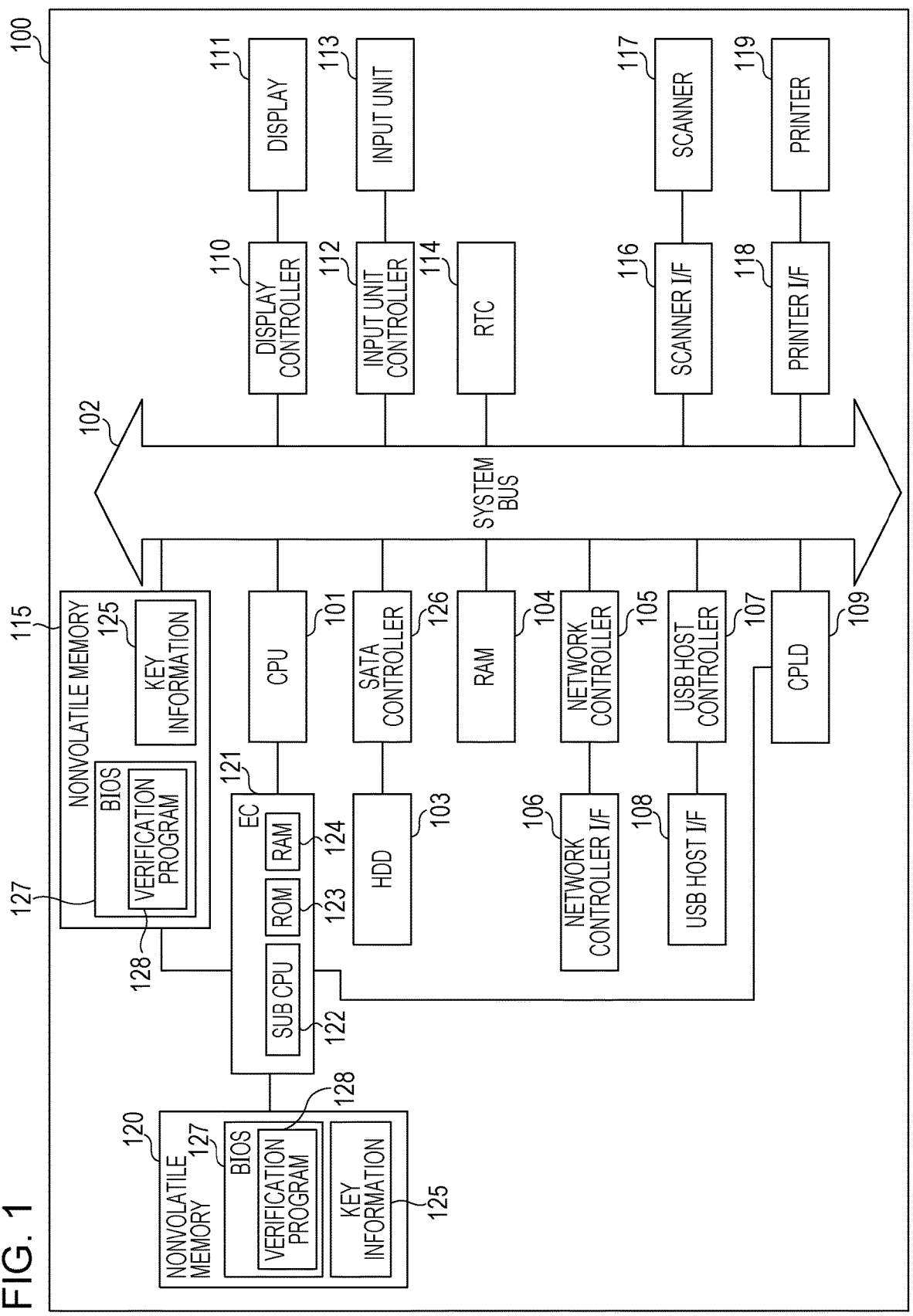
FIG. 1 is a block diagram illustrating a hardware configuration of an image forming apparatus.

FIG. 1 illustrates a hardware configuration of an image forming apparatus 100. The configuration of the image forming apparatus 100 will be described with reference to FIG. 1. A central processing unit (hereinafter referred to as a CPU) 101 causes software for bringing the image forming apparatus 100 into operation to operate. A system bus 102 is a path through which the CPU 101 accesses another unit and through which other units access each other.

A hard disk unit (hereinafter referred to as an HDD) 103 stores software of the image forming apparatus 100, and various types of programs, a database, and a temporarily saved file that are necessary for the image forming apparatus 100 to operate. A serial advanced technology attachment (SATA) controller 126 controls access to the HDD 103. Incidentally, although the HDD is given here as an example, a nonvolatile semiconductor storage device, such as a solid state drive (SSD), may be provided.

Into a random access memory (hereinafter referred to as a RAM) 104, a program of the image forming apparatus 100 is loaded, and the RAM 104 serves as a storage area for variables during program operation, or for data transferred from each unit by using dynamic memory access (hereinafter referred to as DMA).

A network controller 105 and a network controller interface (I/F) 106 establish communication between the image forming apparatus 100 and another apparatus on a network. A Universal Serial Bus (USB) host controller 107 and a USB host I/F 108 control communication between the image forming apparatus 100 and a USB device. This USB host I/F 108 is connected to a USB device by using a USB cable. For some forms of USB devices, direct connection is established without using any USB cable.

A display 111 provides a display so that, for example, a user can check an operation condition of the image forming apparatus 100. A display controller 110 performs display control on the display 111. An input unit 113 receives an instruction from the user to the image forming apparatus 100. An input unit controller 112 controls the input unit 113.

Specifically, the input unit 113 is an input system, such as a keyboard or mouse, a numeric keypad, cursor keys, a touch panel, or a console keyboard. In a case where the input unit 113 is a touch panel, as a mounting form, a form is provided in which the input unit 113 is physically mounted on the front side of the display 111. A real time clock (hereinafter referred to as an RTC) 114 has, for example, a clock function, an alarm function, and a timer function of the image forming apparatus 100. A nonvolatile memory 115 is an erasable nonvolatile memory.

A complex programmable logic device (CPLD) 109 is a unit that reads a Low/High state of a signal line on a board circuit via the CPU 101, or that enables the CPU 101 to change a setting for a Low/High state. The CPLD 109 is a programmable logic device and is a unit that enables power OFF/ON control on the image forming apparatus 100. In the CPLD 109, a general purpose input/output (hereinafter referred to as a GPIO) is present. The CPU 101 changes a setting value for a GPIO register to thus enable power OFF/ON. A scanner 117 scans an original document to generate image data and accesses the system bus 102 via a scanner I/F 116. A printer 119 prints an image on paper in accordance with image data received via a printer I/F 118. A nonvolatile memory 120 is an erasable nonvolatile memory.

An embedded controller (EC) 121 including a sub CPU 122, a read only memory (ROM) 123, and a RAM 124 verifies the validity of a basic input/output system (BIOS) program 127 in the nonvolatile memory 115. In the BIOS program, a verification program 128 to be used for signature verification, which will be described later, is stored. Incidentally, the verification program 128 only has to be stored in at least the BIOS program and may be stored in another program. Furthermore, key information 125 may be included in the BIOS program 127. In a case where the EC 121 is not provided, the CPU 101 and the RAM 104 may serve as replacements for the sub CPU 122 and the RAM 124 in the EC 121.

At a point in time when the EC 121 is energized, the sub CPU 122 executes a program in the ROM 123. As a result, the sub CPU 122 reads EC firmware (ECFW) on the nonvolatile memory 115 and loads it into the RAM 124. The sub CPU 122 uses a program loaded into the RAM 124 to verify the presence or absence of tampering of the nonvolatile memory 115. The EC 121 is also connected to the nonvolatile memory 120 used for the purpose of backup. If it is determined that the nonvolatile memory 115 is in an invalid state, the EC 121 copies the contents of the nonvolatile memory 120 over to the nonvolatile memory 115.

Furthermore, the nonvolatile memory 115 and the nonvolatile memory 120 includes the key information 125. This is a key used for tampering detection to be described. A key based on an encryption scheme that differs depending on the configuration of the image forming apparatus may be provided. In performing tampering detection, the verification program stored in the BIOS program 127 and the key information 125 are used.

Figure 2:
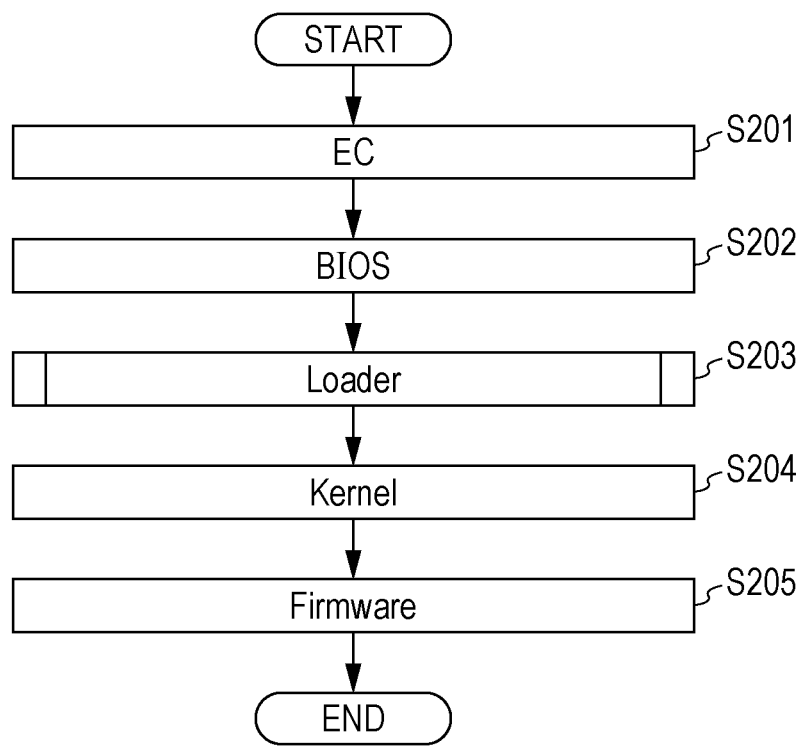
FIG. 2 is a flowchart illustrating an overview of a boot process.

FIG. 2 is a flowchart illustrating an overview of a boot process of the image forming apparatus. A Loader 301, an initial RAM disk (Initrd) 302, a Kernel 303, and pieces of Firmware (306 to 308) that are illustrated in FIG. 2 will be described in detail with reference to FIG. 3 to be described.

First, when a power supply switch is turned ON, the EC 121 is released from its reset state and reads software for the EC 121 recorded in the nonvolatile memory 115 to start its operation (S201).

The EC 121 determines the presence or absence of tampering of the BIOS recorded in the nonvolatile memory 115. When the EC 121 determines that there is no tampering, the EC 121 releases a reset state of the CPU 101 and causes the CPU 101 to start a BIOS process.

Subsequently, the CPU 101 executes the BIOS process (S202). The CPU 101 determines the presence or absence of tampering of the Loader 301 stored in the HDD 103 and also performs an initialization process for each piece of hardware.

As a result of the determination as to tampering of the Loader 301, when there is no tampering, the CPU 101 loads the Loader 301 from the HDD 103 into the RAM 104 to start a process of the Loader 301 (S203). The CPU 101 makes a determination as to tampering of the Kernel 303 and the Initrd 302 stored in the HDD 103.

As a result of the determination as to tampering of the Kernel 303 and the Initrd 302, when there is no tampering, the CPU 101 loads the Kernel 303 and the Initrd 302 into the RAM 104 to start a process of the Kernel (S204). The CPU 101 makes a determination as to tampering of the pieces of Firmware (306 to 308) included in the HDD 103.

The pieces of Firmware in which, as a result of the determination as to tampering, there is no tampering are booted sequentially (S205). In S205 and later, the pieces of Firmware basically await an instruction from the user. For example, when a print instruction is provided, Firmware controls the printer 119, and, when an instruction to cause the scanner 117 to perform scanning is provided, converts a signal read from the scanner 117 into data.

Figure 3:
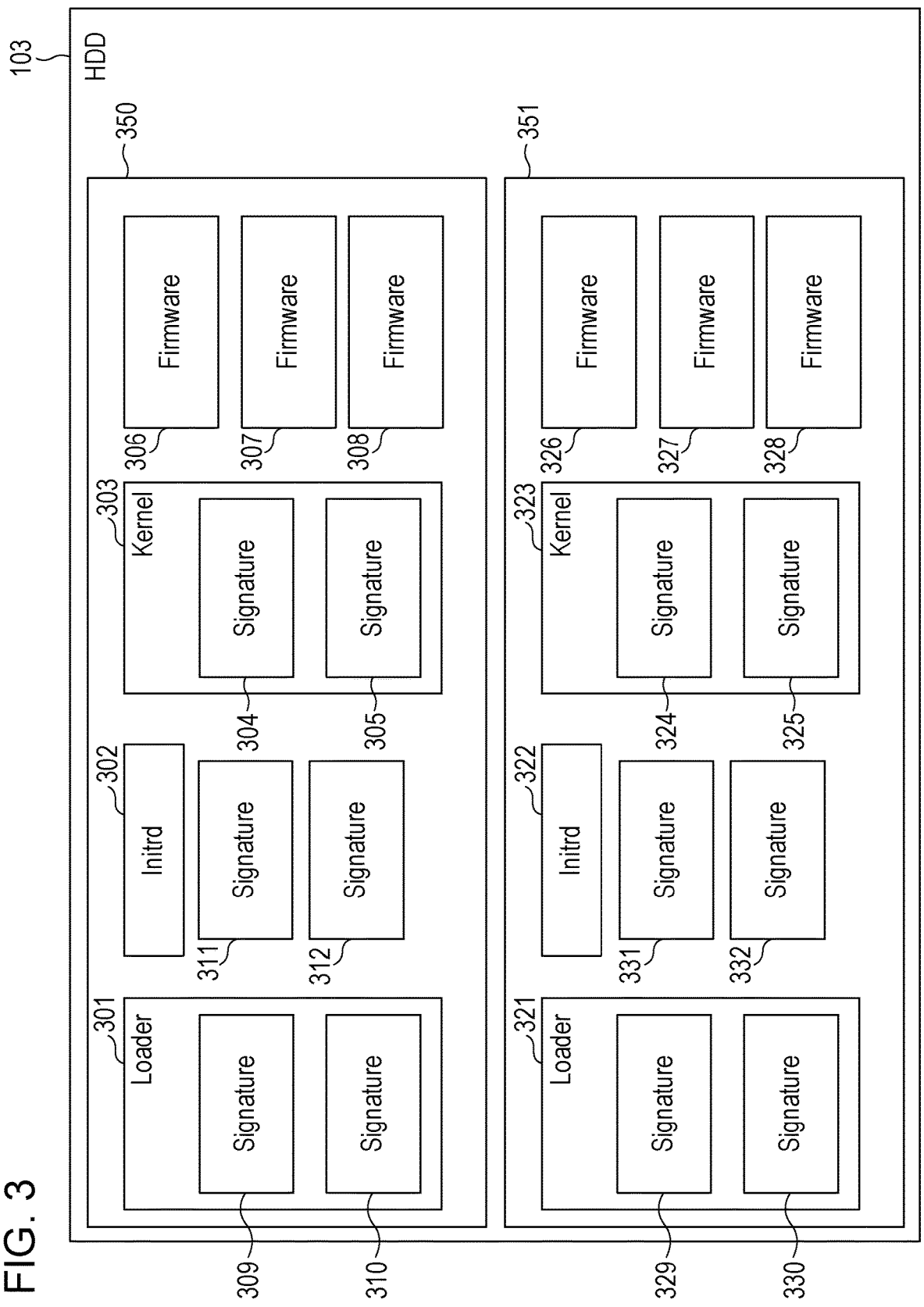
FIG. 3 is a block diagram illustrating an internal configuration of an HDD.

FIG. 3 schematically illustrates contents of the HDD 103. For each piece of software, two sets of software are stored. There are provided a set 350 used for normal use and a set 351 used for the purpose of backup. Although the set 350 will be described here, the set 351 is used, for example, in a case where the set 350 has been tampered with. The set 351 is similar to the set 350, and thus a detailed description thereof is omitted.

As described above, in addition to making a determination as to tampering of the Kernel 303 and the Initrd 302 and performing a boot process, the Loader 301 performs processes of selecting a Kernel to be booted and assigning various types of setting values designated for the Kernel.

Furthermore, the Initrd 302 configured to be usable as a simple substitute during the time that elapses before the Kernel 303 can control the HDD 103 is read into the RAM 104 as a simple file system. The Initrd 302 includes a minimal program and provides a substitute function during the time that elapses before the Kernel 303 can access the contents of the HDD 103.

The Kernel 303 includes various types of device drivers, and these device drivers make various types of hardware operational. Furthermore, the Kernel 303 allocates and manages resources of the CPU 101 and the RAM 104 so that the pieces of Firmware 306 to 308 to be described can operate.

The pieces of Firmware 306 to 308 refer to a plurality of pieces of software that implement functions specific to the image forming apparatus. For example, there are storage firmware that holds and manages print data from the user, and page description language (PDL) firmware that analyzes PDL data or performs a conversion process for causing the printer 119 to print the PDL data. Furthermore, there is, for example, scanner firmware that converts optical data read from the scanner 117 into a file. Although FIG. 3 illustrates, as an example, three pieces of Firmware for each set, a different number of pieces of firmware may be provided, or firmware including another function may be provided.

Here, the Kernel 303 includes signatures including a Signature 304 and a Signature 305. Although, as an example, two signatures are presented here, a different number of signatures may be included. Here, two Signatures are signatures generated by using respective different encryption schemes. Both the Signatures are used to determine the presence or absence of tampering of the Kernel 303. For example, the Signature 304 is a signature generated by using RSA 3072, and the other Signature 305 is a signature generated by using RSA 2048. It goes without saying that another encryption scheme may be used. Incidentally, the RSA 3072 and the RSA 2048 are different encryption schemes. The key information 125 and the verification program that are stored in the nonvolatile memory 115 can verify the presence or absence of tampering of a signature generated by using an encryption scheme corresponding to the key information 125. In other words, verification of the presence or absence of tampering of a signature generated by an encryption scheme not corresponding to the key information 125 is impossible.

Furthermore, as in the Kernel 303, the Loader 301 also includes a plurality of signatures, which are a Signature 309 and a Signature 310.

Furthermore, the Initrd 302 similarly includes a plurality of signatures, which are a Signature 311 and a Signature 312, based on respective different encryption schemes. They may be provided as separate files as illustrated in FIG. 3 or may be incorporated in the Initrd. This holds true for each piece of Firmware (not illustrated).

Figure 4:
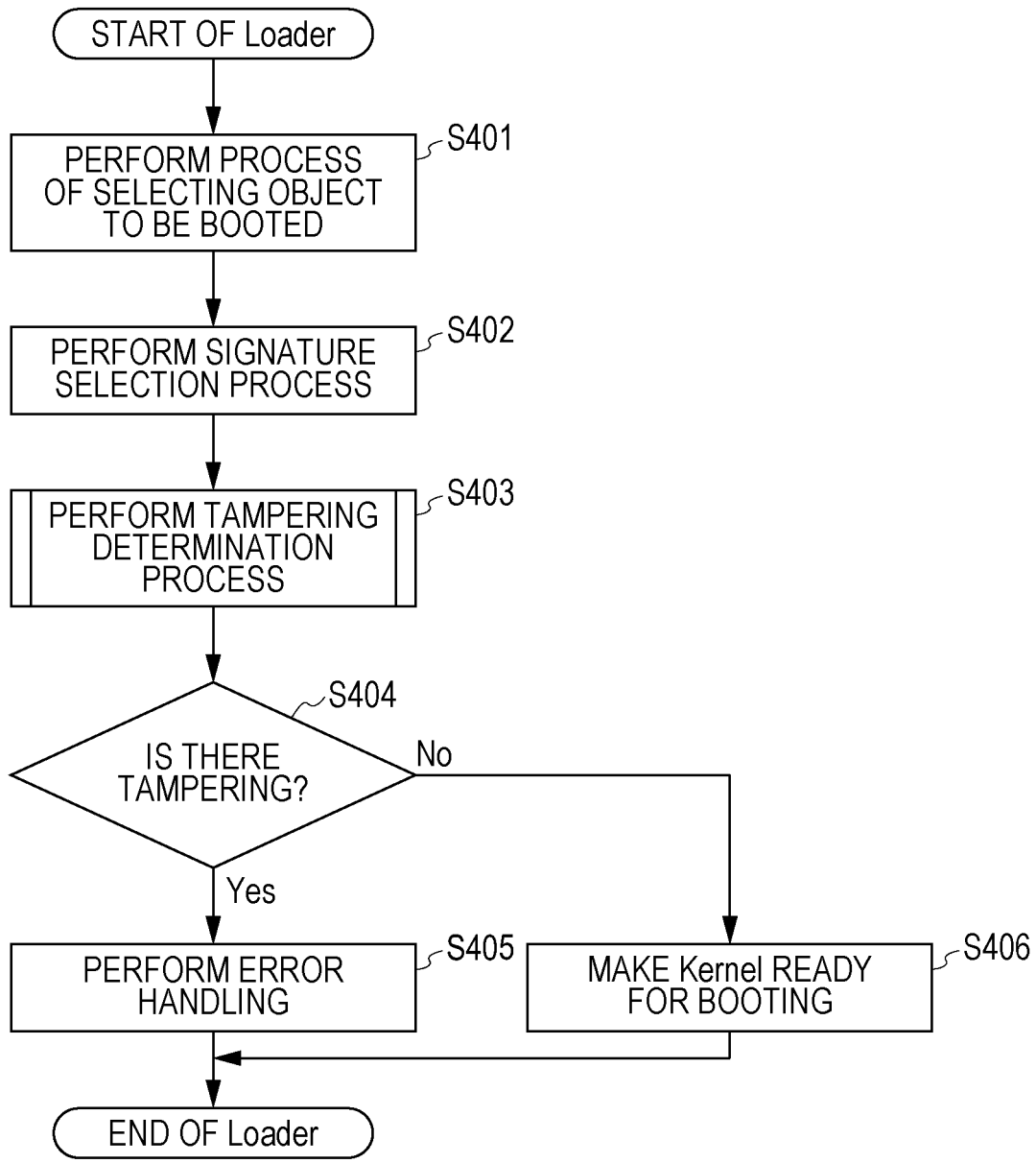
FIG. 4 is a flowchart illustrating a boot process performed by a Loader 301.

FIG. 4 is a flowchart illustrating a tampering determination based on signature selection according to embodiments of the present disclosure and a boot process. The flowchart illustrates specific details at the time when the Loader 301 in S203 of FIG. 2 described above is executed.

First, the CPU 101 performs a process of selecting an object to be booted (S401). In S401, the CPU 101 makes a determination about software to be used. For example, when an input entered through the input unit 113 is detected, the Firmware 307 including an update function is used. When no input is detected, the Firmware 306 is used.

Subsequently, the CPU 101 performs a signature selection process S402 for determining which signature to use in detecting tampering of the Kernel 303. In this embodiment, as described above, two types of signatures, which are the Signature 304 and the Signature 305, are included, and thus one of these signatures is selected (S402).

Specific details will be described with reference to FIG. 5 to be described. Subsequently, the CPU 101 performs a tampering determination process by using the signature determined in S402 (S403). For example, in the apparatus whose key information 125 corresponds to the RSA 2048, the Signature 305 is used. In the apparatus whose key information 125 corresponds to the RSA 3072, the Signature 304 is used.

When the CPU 101 determines in S403 that there is tampering (Yes in S404), the CPU 101 performs error handling (S405). In S405, the CPU 101 may display text or an image representing an error on the display 111, or may attempt to perform recovery by overwriting, with a Loader 321 for backup, the Loader 301 that has been tampered with.

When the CPU 101 determines in S403 that there is no tampering (No in S404), the CPU 101 makes the Kernel 303 ready for booting (for example, loads the Kernel 303) (S406). Subsequently, in S204 of FIG. 2, a program of the Kernel 303 is executed.

In this embodiment, although an example of a flow where the Loader 301 verifies the Kernel 303 is given, such a flow can be applied to verification of other software. For example, when the Loader 301 verifies the Initrd 302, a similar process may be performed. This holds true for flowcharts of FIG. 5 and subsequent figures.

Figure 5:
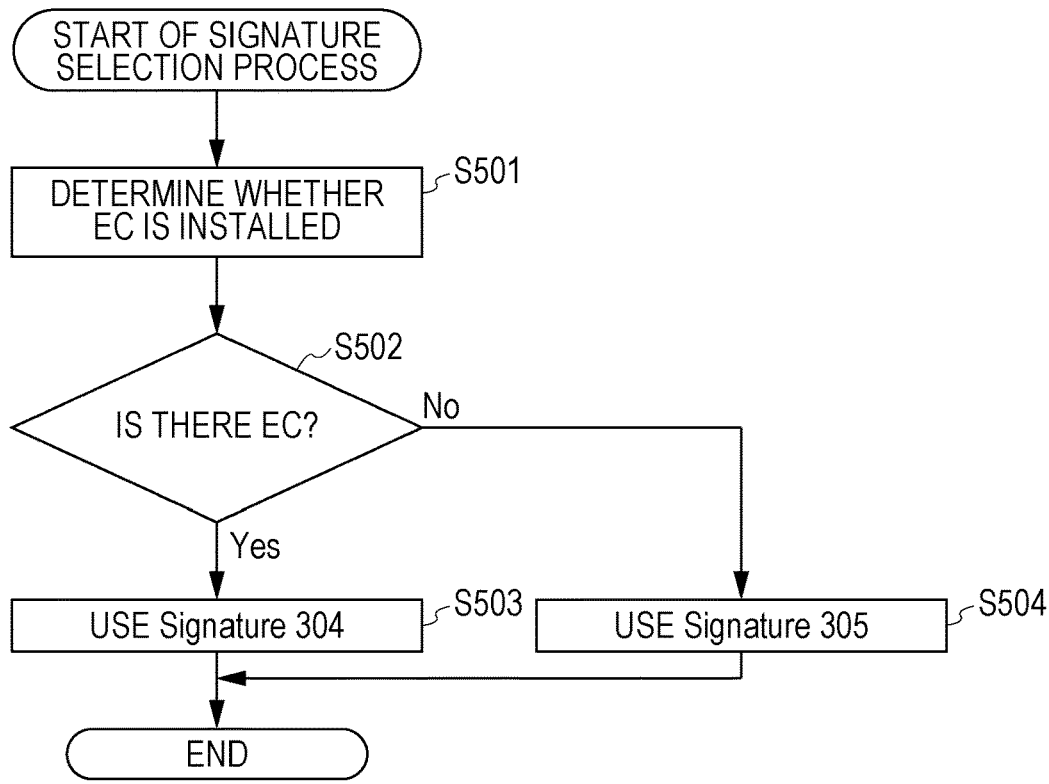
FIG. 5 is a flowchart illustrating a signature selection process.

FIG. 5 is a flowchart illustrating details of S402 of FIG. 4. Here, an example will be described where a determination is made as to whether or not the EC 121 is installed. Assume that, other than the image forming apparatus 100 described with reference to FIG. 1, another image forming apparatus constructed inexpensively does not include the EC 121 and is configured to use the RSA 2048.

First, the CPU 101 determines whether or not the EC 121 is installed (S501). For example, the CPU 101 accesses a port of the CPLD 109 and determines the presence or absence of the EC 121 via the port. Furthermore, if it takes time to make such a determination, a result of a determination that has been made once may be stored in the HDD 103 or the nonvolatile memory 115 to be referred to in making future determinations, thereby achieving simplification. As a result of S501, when the EC 121 is installed (Yes in S502), the Signature 304 is used in S403 (S503). On the other hand, when the EC 121 is not installed (No in S502), the Signature 305 is used in S403 (S504). Specifically, as a result of S501, when the EC 121 is installed (Yes in S502), the key information 125 corresponds to the RSA 3072, which is an encryption scheme, and thus the Signature 304 is used in S403. On the other hand, when the EC 121 is not installed (No in S502), the key information 125 corresponds to the RSA 2048, which is an encryption scheme, and thus the Signature 305 is used in S403.

In the configuration according to this embodiment, even when a plurality of signatures generated by using different encryption schemes are stored, tampering detection can be performed by selecting an appropriate signature, and the time taken to perform tampering detection can be reduced.

Embodiment 2

Figure 6:
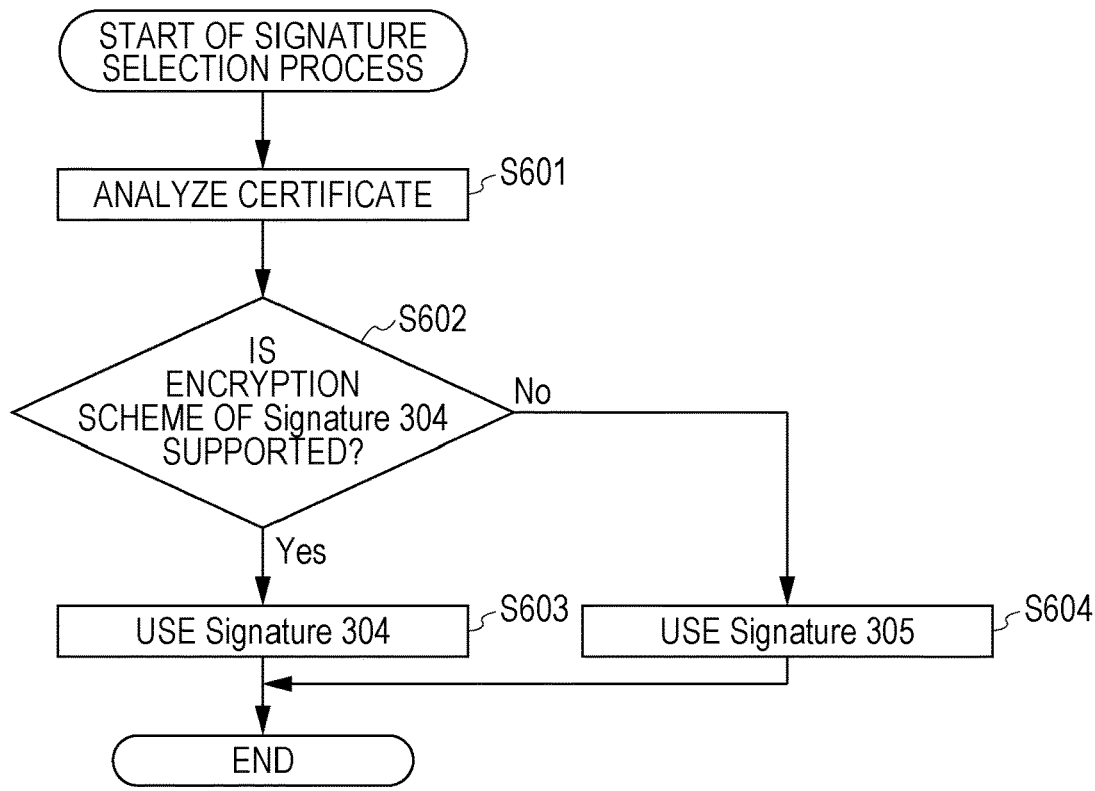
FIG. 6 is a flowchart illustrating a signature selection process.

This embodiment is similar to Embodiment 1 in terms of FIGS. 1 to 4. Thus, a detailed description of FIGS. 1 to 4 is omitted. In this embodiment, FIG. 6 is a flowchart performed in S402 of FIG. 4. FIGS. 5 and 6 differ from each other in terms of a condition to be met in selecting a signature.

FIG. 6 is a flowchart illustrating another example of S402 of FIG. 4. With reference to FIG. 6, a method will be described in which contents of an X509 certificate included in the Kernel 303 are analyzed and an encryption scheme to be used and a signature included in the certificate are determined in accordance with the contents. Incidentally, the X509 certificate is information about a signature, such as a valid period of the signature, a creator, and a supported encryption scheme.

First, the CPU 101 reads the X509 certificate included in the Kernel 303 and examines information about a supported encryption scheme that is included in the certificate (S601).

Furthermore, if it takes time to make such an examination, a result of a determination that has been made once may be stored in the HDD 103 or the nonvolatile memory 115 to be referred to in making future examinations, thereby achieving simplification. When the encryption scheme of the Signature 304 acquired in S601 is supported (Yes in S602), the CPU 101 uses the Signature 304 (S603). A determination as to whether or not an encryption scheme is supported is made, for example, by determining whether or not the encryption scheme coincides with an encryption scheme used in the key information 125. On the other hand, when the encryption scheme is not supported (No in S602), the CPU 101 uses the Signature 305 (S604).

In the configuration according to this embodiment, even when a plurality of signatures generated by using different encryption schemes are stored, tampering detection can be performed by selecting an appropriate signature, and the time taken to perform tampering detection can be reduced.

Embodiment 3

Figures 7, 8:
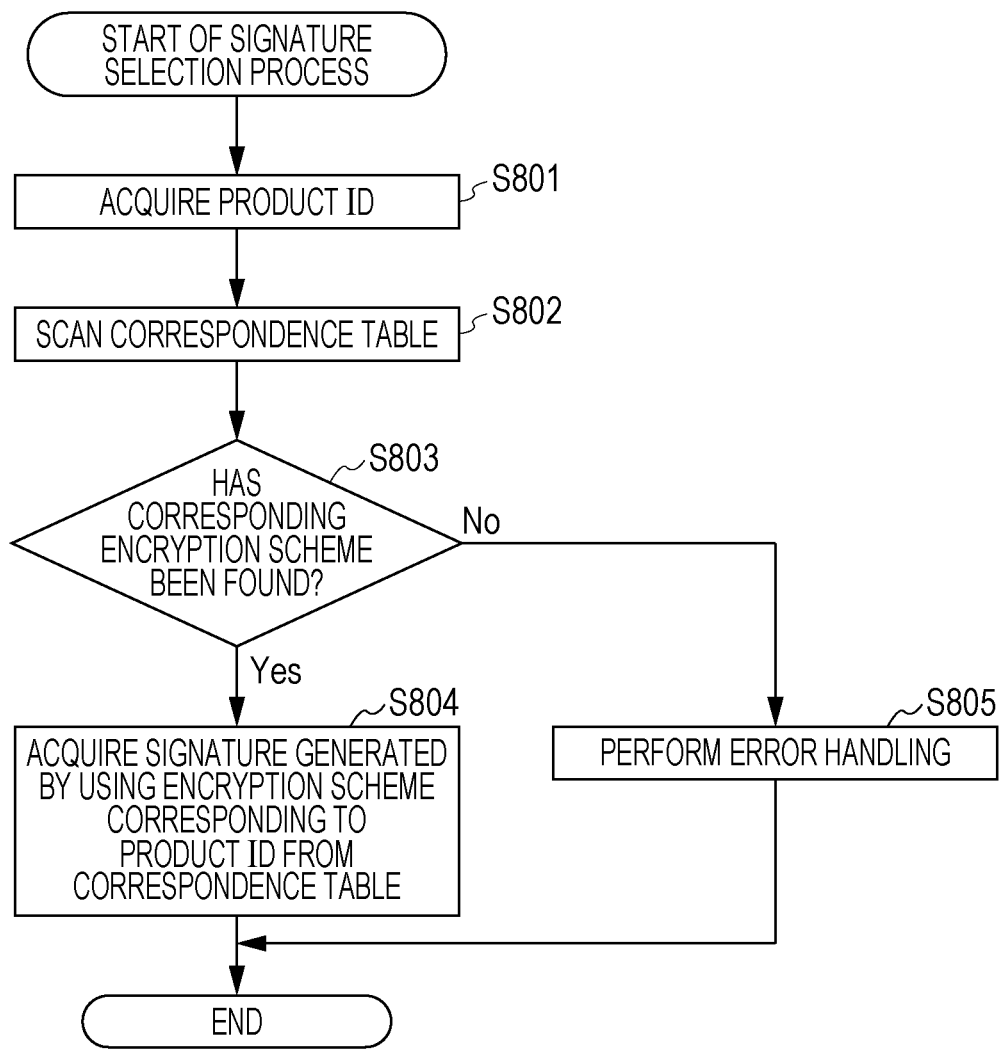
FIG. 7 is a table illustrating a relationship between a product ID and an encryption scheme.
FIG. 8 is a flowchart illustrating a signature selection process.

This embodiment is similar to Embodiment 1 in terms of FIGS. 1 to 4. Thus, a detailed description of FIGS. 1 to 4 is omitted. In this embodiment, FIG. 8 is a flowchart performed in S402 of FIG. 4. FIGS. 5 and 8 differ from each other in terms of a condition to be met in selecting a signature.

FIG. 7 is a table illustrating a correspondence between a product identification (ID) 701 and an encryption scheme 702 that are used in FIG. 8 to be described. The product ID refers to specific information assigned for each image forming apparatus 100 as a product. The table is for determining an encryption scheme used for each product ID and is stored in advance, for example, in the nonvolatile memory 115 or the HDD 103. The table illustrates that, for example, when the product ID 701 is 3, the RSA 3072 is used as the encryption scheme 702.

FIG. 8 is a flowchart illustrating another example of S402 of FIG. 4. With reference to FIG. 8, a method will be described in which an encryption scheme is determined by using the product ID 701 of the image forming apparatus 100 and the correspondence table of FIG. 7.

First, the CPU 101 acquires a product ID 701 (S801). The product ID 701 is stored in advance, for example, in the HDD 103 or the nonvolatile memory 115 and is information representing which model the product thereof is. Next, the CPU 101 acquires the correspondence table of FIG. 7 and performs scanning to check whether there is an encryption scheme 702 by using the product ID 701 acquired in S801 (S802). Furthermore, if it takes time to perform this series of acquisition steps, a result of a determination that has been made once may be stored in the HDD 103 or the nonvolatile memory 115 to be referred to in performing future acquisition steps, thereby achieving simplification.

When a corresponding encryption scheme 702 is found (Yes in S803), the CPU 101 uses a signature corresponding to the encryption scheme 702 acquired in S802 (S804). On the other hand, when no corresponding encryption scheme 702 is found (No in S803), the CPU 101 makes an error determination and performs error handling (S805). An example of error handling refers to displaying, on the display 111, a message to the effect that no signature corresponding to an encryption scheme is found, or using a signature corresponding to a predetermined encryption scheme 702.

In the configuration according to this embodiment, even when a plurality of signatures generated by using different encryption schemes are stored, tampering detection can be performed by selecting an appropriate signature, and the time taken to perform tampering detection can be reduced.

Other Embodiments

Various examples and embodiments of the present disclosure have been described above, but the gist and scope of the present disclosure are not to be limited to a specific description in the present specification.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-184542, filed Nov. 12, 2021, which is hereby incorporated by reference herein in its entirety.

What is claimed is:

1. An information processing apparatus comprising:
a storage device configured to store a program including at least a first signature generated by using a first encryption scheme and at least a second signature generated by using a second encryption scheme; and
a controller having one or more processors which execute instructions stored in one or more memories, the controller being configured to:
specify whether a second controller that is different from the controller is configured in the information processing apparatus,
verify, in a case where it is specified that the second controller is not configured in the information processing apparatus, whether or not the first signature corresponding to the first encryption scheme is valid,
wherein the second controller verifies, in a case where it is specified that the second controller is configured in the information processing apparatus, whether or not the second signature corresponding to the second encryption scheme is valid, and execute, when the first signature or the second signature is verified to be valid, the program.

2. The information processing apparatus according to claim 1, further comprising:

a second storage device configured to store a verification program to be executed by the controller and key information to be used in executing the verification program, the second storage device that is different from the storage device, wherein the controller performs verification by using the verification program and the key information.

3. The information processing apparatus according to claim 2, wherein the second controller is configured to verify a second program that is different from the program and includes the verification program.

4. The information processing apparatus according to claim 2, wherein the second controller connects a third storage device that is different from the storage device and the second storage device and that includes the second program and information of the second signature, and wherein the second controller supports the first encryption scheme.

5. The information processing apparatus according to claim 3, wherein the second program is a basic input/output system (BIOS) program.

6. The information processing apparatus according to claim 1, wherein the program includes information about a supported encryption scheme, and wherein the controller determines which encryption scheme the information about the supported encryption scheme is.

7. The information processing apparatus according to claim 1, wherein the storage device stores specific information of the information processing apparatus, and information about an encryption scheme corresponding to the specific information.

8. The information processing apparatus according to claim 7, wherein the controller acquires the specific information of the information processing apparatus, and determines which encryption scheme an encryption scheme corresponding to the acquired specific information is.

9. The information processing apparatus according to claim 8, wherein the controller makes an error determination by determining that the acquired specific information is not stored in the storage device.

10. The information processing apparatus according to claim 1, wherein the program is a Loader.

11. The information processing apparatus according to claim 1, wherein the program is a Kernel.

12. The information processing apparatus according to claim 1, wherein the first encryption scheme is Rivest-Shamir-Adleman (RSA) 3072, and wherein the second encryption scheme is RSA 2048.

13. A control method for an information processing apparatus including a storage device configured to store a program including at least a first signature generated by using a first encryption scheme and at least a second signature generated by using a second encryption scheme, and a controller configured to read a signature from the storage device and verify validity of the read signature, the control method comprising:

specifying whether a second controller that is different from the controller is configured in the information processing apparatus;

verifying, in a case where it is specified that the second controller is not configured in the information processing apparatus, whether or not the first signature corresponding to the first encryption scheme is valid;

wherein the second controller verifies, in a case where it is specified that the second controller is configured in the information processing apparatus, whether or not the second signature corresponding to the second encryption scheme is valid; and executing, when the first signature or the second signature is verified to be valid, the program.

\* \* \* \* \*